US012785971B2

(12) United States Patent
Sachdeva

(10) Patent No.: US 12,785,971 B2
(45) Date of Patent: Nov. 3, 2026

(54) METHOD AND SYSTEM FOR SECURED AND PRIVATE ONBOARDING OF A USER IN A SOCIAL MEDIA APPLICATION

(71) Applicant: Harpreet Sachdeva, Gurugram (IN)

(72) Inventor: Harpreet Sachdeva, Gurugram (IN)

(73) Assignee: Harpreet Sachdeva, Gurugram (IN)

( * ) Notice: Subject to any disclaimer, the term of this patent is extended or adjusted under 35 U.S.C. 154(b) by 64 days.

(21) Appl. No.: 18/824,242

(22) Filed: Sep. 4, 2024

(65) Prior Publication Data

US 2026/0067088 A1 Mar. 5, 2026

(51) Int. Cl.

*H04L 9/32* (2006.01)
*G06F 9/54* (2006.01)
*H04L 9/06* (2006.01)
*H04L 9/08* (2006.01)

(52) U.S. Cl.

CPC ............ *H04L 9/3226* (2013.01); *G06F 9/547* (2013.01); *H04L 9/0631* (2013.01); *H04L 9/0825* (2013.01)

(58) Field of Classification Search

CPC ... H04L 9/3226; H04L 9/0631; H04L 9/0825; G06F 9/547
USPC .......................................................... 713/155
See application file for complete search history.

(56) References Cited

U.S. PATENT DOCUMENTS 11,714,923 B2 * 8/2023 Taschek .................. G06F 21/64 726/26
12,079,367 B2 * 9/2024 Dange ..................... G06F 21/32
2016/0337346 A1 * 11/2016 Momchilov ............ G06F 21/41

FOREIGN PATENT DOCUMENTS

CN 110138734 A * 8/2019 ......... H04L 63/0823

OTHER PUBLICATIONS

Amin et al, Lockr: Better Privacy for Social Networks (Year: 2009).*
Lorenz et al, SoNet Privacy and Replication in Federated Online Social Networks (Year: 2013).*

* cited by examiner

*Primary Examiner* — Moeen Khan
(74) *Attorney, Agent, or Firm* — Nicholas Palacio

(57) ABSTRACT

An approach is disclosed for secured and private onboarding of a user in a social media platform. An application initiates an API call to a user ID service via a web server which requests a generation of a 16-digit unique user identifier. The user ID service generates and transmits the unique user identifier to the web server. The web server receives the unique user identifier, generates a public key and a private key and creates a default circle with one or more attributes and functions associated with the user identifier. The web server creates a circle of influence associated with a circle object which includes metrics to track the user's influence on the platform. The web server assigns a unique hash address to the created objects, encrypts the unique hash address using the generated public key, and transmits the encrypted hash address and the private key back to the application.

21 Claims, 5 Drawing Sheets

400

METHOD AND SYSTEM FOR SECURED AND PRIVATE ONBOARDING OF A USER IN A SOCIAL MEDIA APPLICATION

FIELD OF TECHNOLOGY

Certain embodiments of the disclosure relate to the field of social media technology. Specifically, it pertains to methods and systems for securely onboarding users to a social media platform. More specifically, certain embodiments of the disclosure provide a method for onboarding a user to an application.

BACKGROUND

The invention pertains to the field of mobile application technology, specifically in the domain of user onboarding and identity management for social media platforms. Modern social media applications require secure and efficient methods to onboard users while maintaining privacy and data integrity. Typically, this involves downloading and installing applications from marketplaces or direct link, generating unique user IDs, and ensuring that user data and interactions are securely managed.

Currently, social media platforms face significant challenges in handling user identities and interactions. Traditional solutions involve creating multiple IDs for different types of contacts or joining custom-designed social media platforms such as LinkedIn for professional connections, Tinder for dating, and Facebook for friends. However, these approaches do not offer a seamless experience and often compromise privacy and data security. Centralized systems, where IDs and data are stored on company-owned servers, are prone to hacking, data manipulation, and privacy breaches. Even with decentralized blockchain environments, users are often limited to single-dimensional identities, which fail to address the complexity of user interactions and classifications.

The present invention addresses several critical technical problems inherent in current social media solutions. Users need to manage their various social connections and interactions effectively, which is not feasible with a single ID. For instance, individuals wish to share different content with family, friends, and work associates without overlap. Additionally, users desire privacy and the ability to control who sees their content, which is challenging with current single-dimensional identity systems. The lack of proper classification and privacy can lead to compromised user experience and data security. Furthermore, users need solutions that provide pseudo-identities to maintain anonymity in specific contexts, a requirement that existing social media platforms fail to meet.

OBJECT OF THE INVENTION

The objective of the invention is to ensure secure and efficient onboarding of users with enhanced user experience and security during the onboarding process.

Another objective of the invention is to create anonymized unique user identification process that guarantees the uniqueness of user identification, prevents conflicts and ensures accurate user tracking.

Yet another objective of the invention is to facilitate secure data encryption and decryption, protecting user information and maintaining data integrity.

Further, another objective of the invention is creation of circles and circle of influence (CoI) for the users that enables initial configuration and tracking of user interactions, providing a customized and relevant user experience.

BRIEF SUMMARY OF THE DISCLOSURE

A system and method for secured and private onboarding of a user in a social media platform, substantially as shown in and/or described in connection with at least one of the figures, as set forth more completely in the claims.

In a first aspect, the disclosure relates to a method for secured and private onboarding of a user in a social media platform, the method comprising

- installing the application onto a user device;
- launching the application, wherein the application displays a launch screen;
- initiating an API call from a web server to a user ID service upon receiving instruction from the application of the user device, wherein the API call requesting the generation of at least one 16-digit random unique user identifier;
- receiving, by the web server, the at least one unique user identifier from the user ID service;
- generating, by the web server, a public key and a private key upon receipt of the received user identifier;
- creating, by the web server, a circle object and a circle of influence (COI) object associated with the at least one user identifier, wherein the circle object comprises of one or more attributes and functions represents a group of users created for one or more specific purposes, and wherein the COI object comprises of one or more attributes and functions to track and update the circle object based on the user activities in the social media application;
- creating, by the web server, hash address of the created circle object and circle of influence (COI) object, wherein the circle hash address is based on a circle identifier and the user identifier, wherein the circle of influence hash address is based on the circle hash address and circle of influence identifier;
- encrypting, by the web server, the hash address of the circle object and the Circle of Influence (COI) object using the generated public key;
- transmitting, by the web server, the at least one user identifier, the encrypted hash addresses, and the private key back to the application on the user device.

Optionally, the user ID service comprises of one or more algorithms to generate the at least one user identifier.

Optionally, the one or more attributes of the circle object comprises of circle identifier, user identifier, circle name, data of circle creation, members, permissions, activity feed, and visibility settings, wherein the one or more functions of the circle object comprises of member management functions, content management functions, notification functions, moderation functions and analytics functions.

Optionally, the one or more attributes of the circle of influence comprises of circle of influence identifier, influence score, interaction metrics, role definitions and content visibility, wherein the one or more functions of the circle of influence comprises of influence calculation functions, role management functions, content prioritization functions and insight functions.

Optionally, displaying a user interface on the user device to allow the user to modify values in the one or more attributes of the created circle object.

Optionally, the public and private keys are generated using an asymmetric cryptographic algorithm.

Optionally, storing the user identifier, the encrypted hash address and the private key in a secure storage area of the user device.

Optionally, the encryption of the hash address is performed using the Advanced Encryption Standard (AES) algorithm.

Optionally, the web server periodically updates the one or more attributes of the circle based on user activity and interactions detected by the circle of influence objects.

Optionally, the launch screen includes an animation or progress indicator to inform the user of the ongoing onboarding process.

Optionally, verifying the user based on OTP or task-based captcha for human verification.

In another aspect the present disclosure provides a system for secure and private onboarding a user. The system comprises a processor configured to execute non-transitory machine-readable instructions. The system comprises

- a user device comprising a secure storage area, configured to:
  - install the application; and
  - launch the application, wherein the application displays a launch screen;
- a server arrangement communicable coupled with the user device comprises,
  - a web server configured to initiate an API call to a user ID service upon receiving instruction from the application of the user device, the API call requesting the generation of at least one 16-digit unique user identifier;
  - the user ID service configured to generate and transmit the at least one 16-digit unique user identifier to the web server;
  - the web server further configured to:
    - receive the at least one unique user identifier from the user ID service;
    - generate a public key and a private key based on the received user identifier;
    - create a circle object and a circle of influence (COI) object associated with the user identifier, wherein the circle object comprises of one or more attributes and functions to represents a group of users for one or more specific purpose, and wherein COI object comprises of one or more attributes and functions to track and update the circle object based on the user activities in the social media application;
    - create hash address of the created circle object and circle of influence (COI) object, wherein the circle hash address is based on a circle identifier and the user identifier, wherein the circle of influence hash address is based on the circle hash address and circle of influence identifier;
    - encrypt the unique hash address of the circle object and the circle of influence (COI) object using the generated public key;
    - transmit the at least one user identifier, the encrypted hash addresses, and the private key back to the application on the user device.

Optionally, the user ID service comprises of one or more algorithms to generate the at least one user identifier.

Optionally, the one or more attributes of the circle object comprises of circle identifier, user identifier, circle name, data of circle creation, members, permissions, activity feed, and visibility settings, wherein the one or more functions of the circle object comprises of member management functions, content management functions, notification functions, moderation functions, and analytics functions.

Optionally, the one or more attributes of the circle of influence comprises of circle of influence identifier, influence score, interaction metrics, role definitions, and content visibility, wherein the one or more functions of the circle of influence comprises of influence calculation functions, role management functions, content prioritization functions, and insight functions.

Optionally, displaying a user interface on the user device to allow the user to modify values in the one or more attributes of the created circle object.

Optionally, the public and private keys are generated using an asymmetric cryptographic algorithm.

Optionally, storing the user identifier, the encrypted hash address and the private key in a secure storage area of the user device.

Optionally, the encryption of the hash address is performed using the Advanced Encryption Standard (AES) algorithm.

Optionally, the web server periodically updates the one or more attributes of the circle based on user activity and interactions detected by the circle of influence objects.

Optionally, the launch screen includes an animation or progress indicator to inform the user of the ongoing onboarding process.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
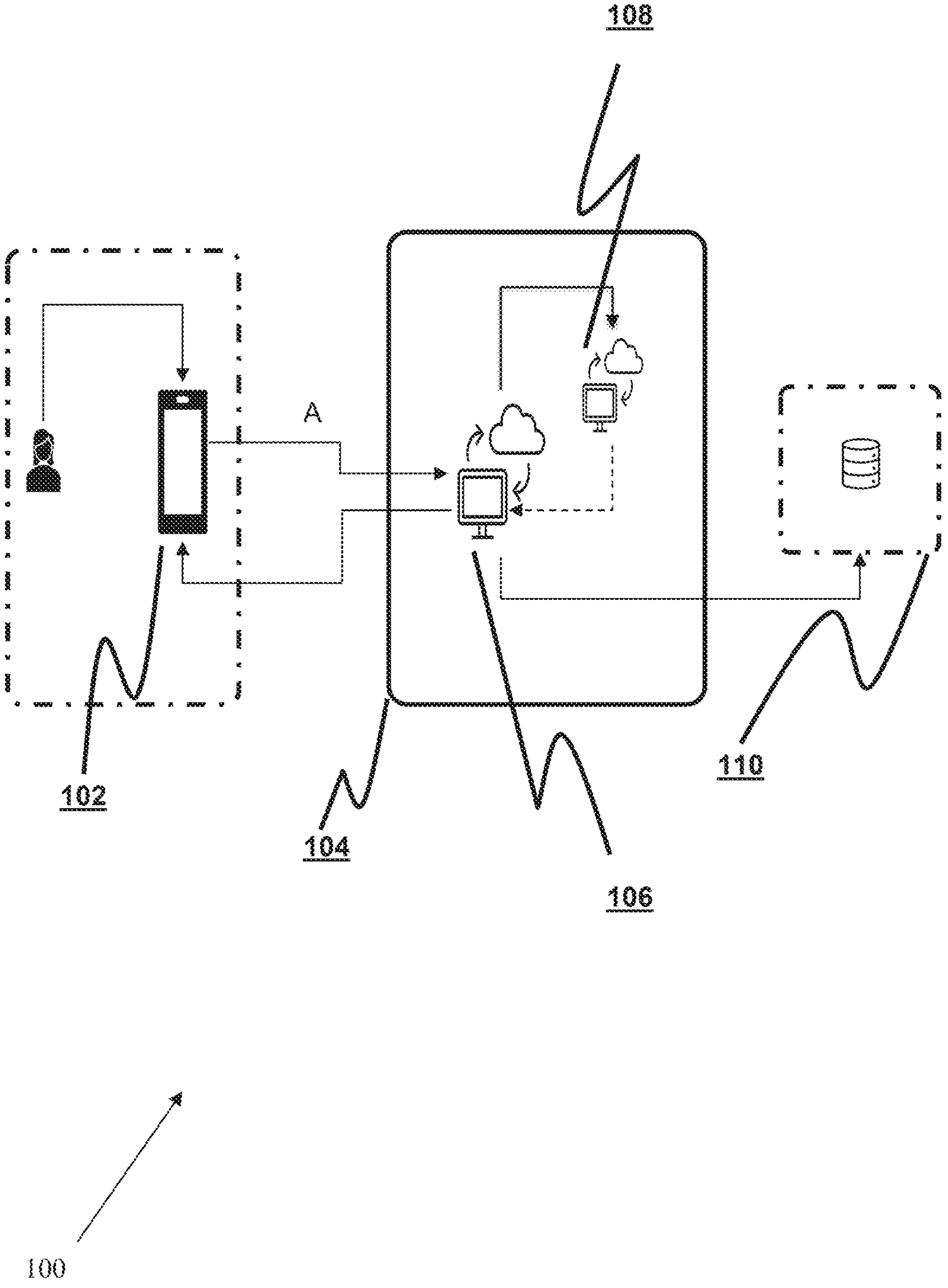
FIG. 1 is a block diagram that illustrates an exemplary system for secure and private onboarding of users in a social media platform, in accordance with an exemplary embodiment of the disclosure.

Certain embodiments of the disclosure relate to a method and system for secure and private onboarding users to a social media application. The term onboarding refers to the series of steps involved in securely and privately integrating a new user into the social media platform. Optionally, the term onboarding refers to a series of technical procedures executed to securely incorporate a user into the system. Beneficially, the technical procedures involves installing the necessary application, initiating API calls to generate unique user identifiers, and setting up user-related objects and security measures within the platform's ecosystem. This process ensures that the user's entry into the system is both secure and private, with appropriate cryptographic techniques employed to safeguard user data. In an embodiment, the secure and private onboarding also refers to user enrolment, user activation, initial user setup, and/or initialization. Optionally, the secure and private registration of a user into the system, involves the generation of unique identifiers and the setup of user-related entities and permissions. Optionally, the process of enabling a user to begin using a system securely, involves the creation and initialization of user credentials, objects, and security keys. Optionally, the secure configuration and establishment of a user's account and associated entities within a platform, ensures privacy and security throughout the process. Optionally, the process of securely initializing and setting up a new user's account and related objects in a system, incorporating the generation and management of user-specific cryptographic keys and identifiers. The social media application is the front-end application of a social media platform that enables users across the globe to interact in an anonymous, private and secure manner and conduct social interactions and transactions digitally. Beneficially, the system and method ensure user privacy and security, while allowing seamless interactions between users, and prevent sharing of personal data with the social media platform.

Users download and install the application from a marketplace and are presented with a launch screen upon initiation. The application then initiates an API call to a server to generate a 16-digit unique user identifier. Subsequently, the server arrangement creates cryptographic public and private keys associated with this user identifier to facilitate secure communication and data encryption. The server arrangement creates a circle object and a circle of influence (COI) object associated with the user identifier to track metrics related to the user's interactions on the social media platform. Beneficially, the creation of circles and COI allows the user to enable social interactions and transactions. The server arrangement creates hash address of the created circle object and circle of influence (COI) object. The circle hash address is based on a circle identifier and the user identifier, wherein the circle of influence hash address is based on the circle hash address and circle of influence identifier. The hash address of the circle object and the Circle of Influence (COI) object are encrypted using the generated public key to ensure the security of the data during transmission. The encrypted hash addresses, the user identifier, and private key are sent back to the application.

The user identity data i.e., the encrypted hash addresses, the user identifier, and private key is stored securely on the user device, embedded within the application to protect user privacy. The system synchronizes this local data with the server to verify the user before allowing access to the server arrangement, while ensuring that user identities and interactions are seamlessly managed across both environments. This dual-storage approach enhances data security while maintaining ease of access for the user. To further protect user privacy, pseudo profiles are created to represent users anonymously, shielding their real identity. These pseudo profiles allow the system to manage user identities dynamically, accommodating changes such as new phone numbers without disrupting the user experience. By leveraging cryptographic techniques, pseudo profiles, and efficient data management, the system ensures that user identities are protected while enabling rich social interactions on the platform.

The server arrangement employs a unique 16-digit user ID generated by a user ID service and leverages cryptographic techniques to enhances the security of user identities. This approach ensures that user identity data is stored securely on the user's mobile device and is not shared with the server, thus protecting user privacy. The creation of public and private keys further safeguards user data by enabling secure communication and data encryption.

The inclusion of circle objects and circle of influence (COI) objects allows for the personalization and tracking of user interactions within the platform. These objects, linked to the unique user ID, provide a structured way to monitor user engagement and influence, enhancing the user experience and enabling targeted features without compromising privacy.

The assignment of unique hash addresses to the created objects, followed by their encryption using public keys, adds an additional layer of security. Beneficially, this ensures that the integrity and confidentiality of the user data, circle, and COI are maintained. The verification of public and private keys by the web server before encryption further ensures that the keys have not been tampered with, providing a robust mechanism to prevent unauthorized access and data breaches.

Storing user identity data locally on the mobile device minimizes the risk of data exposure through server breaches. By embedding the user identity data within the application and using a secure storage area on the mobile device, the system ensures that sensitive information remains under the user's control.

The decentralized approach to data storage and processing aligns with modern privacy regulations and user expectations. Users are empowered to manage their identities and data, fostering trust and encouraging more active participation on the platform. This method also reduces the platform's liability and the burden of securing large volumes of personal data on centralized servers.

Overall, the system and method described provide a comprehensive solution for secure and private onboarding of user in social media applications. By combining unique user IDs, cryptographic techniques, and decentralized data storage, the system ensures high levels of security and privacy, fostering a safe and trustworthy environment for digital social interactions.

This example implementation of a web server for a social media application utilizes Node.js and Express.js to handle user registration, login, and posting functionalities. The project is initialized with a package manager, and necessary packages like express, mongoose, bcryptjs, and jsonwebtoken are installed. The directory structure is organized into models, routes, and the main server file.

The User model (models/User.js) is defined to handle user data, including username, email, phone number, and password, with password encryption using bcryptjs. The Post model (models/Post.js) manages posts created by users, storing the user ID, content, and creation date. The authentication routes (routes/auth.js) provide endpoints for user registration and login. The registration endpoint creates a new user and stores the user information in a MongoDB database. The login endpoint authenticates users by comparing the provided password with the stored hashed password, generating a JSON Web Token (JWT) for authenticated users. The post routes (routes/posts.js) include middleware to authenticate JWT tokens. The routes allow users to create new posts and retrieve all posts, ensuring that only authenticated users can perform these actions. Posts are linked to user IDs, and user information is populated when retrieving posts.

In addition, the web server is further configured to receive a 16-digit unique user ID from a user ID service and generate a public key and private key based on the received user ID. The server then creates at least one default circle object with predefined values and at least one Circle of Influence (COI) object associated with the user ID. The default circle object is linked to the COI object, which includes metrics or initial settings to track the user's influence as they interact on the platform. A unique hash address is assigned to these created objects, including the user ID, circle, and COI. This hash address is encrypted using the generated private key, and the encrypted hash address along with the private key is transmitted back to the application on the mobile device. The web server also verifies the integrity of the public and private keys before encrypting the hash address to ensure they have not been tampered with.

The main server file (server.js) sets up the Express application, connects to the MongoDB database, and includes middleware for parsing JSON requests. It also defines the routes for authentication and posts, starting the server on a specified port. Environment variables are stored in a .env file, including the MongoDB connection string, JWT secret, and server port. The server is started by running the node server.js command, and API endpoints are used to register new users, log in, create posts, and retrieve posts.

This implementation demonstrates how user identity data is securely handled, with registration and authentication processes ensuring user privacy. The use of JWT tokens for authentication and the organization of routes and models provide a scalable and maintainable structure for the social media application. This setup can be extended with additional features like user profiles, social interactions, and content moderation to create a fully functional social media platform. The added functionality of generating cryptographic keys, creating circle and COI objects, and ensuring the integrity of these objects enhances the security and reliability of the user onboarding process.

In an embodiment, the user downloads and installs the application from a marketplace (e.g., Google Play Store or Apple App Store). The user launches the application, and the launch screen is displayed. The mobile application initiates an API call to the user ID service on a user server via the web server. The API call requests the generation of a 16-digit unique user ID. The user ID service on the user server generates a 16-digit unique user ID. The user ID service transmits the unique user ID to the web server. The web server receives the 16-digit unique user ID. The web server generates a public key and a private key based on the received user ID. The web server creates a default circle with predefined values associated with the user ID. The web server also creates at least one Circle of Influence (COI) associated with the user ID. The COI includes metrics or initial settings to track the user's influence on the platform. The web server assigns a unique hash address to the created objects (user ID, circle, and COI). The web server encrypts the unique hash address using the generated public key. The web server transmits the encrypted hash address and the private key back to the application on the mobile device.

FIG. 1 is a block diagram that illustrates an exemplary system for secure and private onboarding of users in a social media platform. Referring to FIG. 1, a system 100 comprises of a user device 102 and a server arrangement 104 communicable coupled via a communication network. The server arrangement 104 comprises of a web server 106, a user identifier service 108, and a database arrangement 110. Beneficially, the user device 102 and the server arrangement 104 enables private and secure onboarding of a user to a social media application.

In an embodiment, the user device 102 comprises a mobile device, tablet, desktop computers, laptops, smart TV, wearable devices, gaming console, smart home devices, Virtual Reality (VR) *and Augmented Reality (AR) Devices. In an embodiment, implementing the system 100 on a wide range of devices enhances its accessibility and user engagement. From tablets and desktops to smart TVs and wearables, the system 100 ensures that users beneficially enjoy secure, seamless social interactions and content consumption across various platforms and devices. In an embodiment, tablets, like mobile devices, offer a similar environment for applications. Tablets provide larger screens, which enhances the user experience for social interactions, media consumption, and content creation. The system 100 is seamlessly adapted for use on both Android and iOS tablets. In an embodiment, desktop computers and laptops provide more powerful hardware and larger displays, which can be advantageous for users engaging in extensive content creation, media editing, and detailed social interactions. In an embodiment, smart TVs allow users to access social media content on a larger screen, making it suitable for consuming multimedia content such as videos and live streams. The system 100 optionally adapted into an app available on smart TV platforms like Android TV, Apple TV, and Amazon Fire TV. In an embodiment, wearable devices, such as smartwatches and fitness trackers, offer limited but valuable interaction capabilities. The system 100 optionally provide notifications, quick updates, and lightweight interactions through apps designed for platforms like Apple WatchOS and Google Wear OS. In an embodiment, gaming consoles, including PlayStation, Xbox, and Nintendo Switch, often feature integrated social media functionalities. The system 100 optionally adapted to provide social interactions, content sharing, and media consumption through dedicated apps available on these consoles. In an embodiment, smart home devices, such as smart speakers and smart displays (e.g., Amazon Echo Show, Google Nest Hub), can be used to access social media content through voice commands and visual displays. The system 100 optionally integrated to provide updates, notifications, and media content on these devices. In an embodiment, VR and AR devices offer immersive environments for social interactions. The system 100 optionally adapted to provide virtual social spaces, interactive media, and augmented social interactions on platforms like Oculus, HTC Vive, and Microsoft HoloLens.

The server arrangement 104 in the system 100 comprises three main components: a web server 106, a user ID service 108, and a database 110. Each component plays a crucial role in managing user onboarding, identity, and interactions within the social media application. The web server 106 in the system 100 handles HTTP requests from clients (such as mobile applications or web browsers) and delivers web content and services to the user device 102. In this system, the web server 106 acts as the intermediary between the user device 102 and backend services. The web server 106 handles API calls initiated by the user device 102, processes these requests, and returns the appropriate responses. The web server 106 initiates API calls to the user ID service 108, generates public and private keys based on a user identifier, creates default circle objects and COI objects, generates unique hash addresses, encrypts these addresses, and transmits the encrypted data back to the user device 102. The user ID service 108 is a specialized backend service responsible for generating unique user identifiers. This service 108 is called by the web server 106 to create a unique 16-digit user identifier for each new user during the onboarding process. Optionally, the user ID service 108 independently creates one or more user identifier for a user of a user device 102. Beneficially, each of the one or more user identifier is independent of the other user identifier. Further, beneficially, the web server 106 independently instructs the user ID service 108 to create one or more user identifier for a user of a user device 102. Upon receiving an API call from the web server 106, the user ID service 108 generates a unique user identifier using predefined algorithms or methods to ensure that each identifier is distinct. The user ID service 108 then transmits the generated user identifier back to the web server 106 for further processing. The database 110 is a structured collection of data that can be easily accessed, managed, and updated. It stores various types of information necessary for the application to function. In this system 100, the database 110 stores all relevant data for providing the services under the social media platform, including circles objects and COI objects, and any other necessary information for feed management and interaction tracking.

The user ID service 108 is a critical component in the server arrangement 104, especially for generating unique identification number and secure management of user identities. The user ID service 108 generates one or more user identifier for a user of a user device 102, upon an API call from the web server 106. Optionally, the user ID service 108 is configured to store a plurality of generated user identifier in the database arrangement 110. In an embodiment the user ID service 108 is implemented in one of microservices architecture or service-oriented architecture (SOA). Beneficially, the microservices architecture allows the user ID service 108 to scale independently and be maintained separately from other components. Beneficially, the service-oriented architecture allows the user ID service 108 to communicate with other services (like the web server 106 and database 110) through well-defined APIs. In an embodiment, depending on the language of implementation, appropriate frameworks can be chosen to provide a structured approach for handling API requests, security, and database interactions. Optionally, the user ID service 108 exposes endpoints to generate new user identifiers and retrieve existing user identifiers. Optionally, the user ID service 108 stores user identifiers and related data in the database 110. Optionally, the database 110 stores user identifiers, creation timestamps, and any associated metadata. In an embodiment, OAuth2 and JWT are used to secure API endpoints of the user ID service 108. Beneficially, secure API endpoints ensure only authorized applications can generate or access user identifiers. Further beneficially, role-based access control (RBAC) ensures that only specific services, e.g., web server 106, have the permissions to generate new user identifiers or access sensitive data. In an embodiment, all communications with the user ID service 108 to and from the web server use HTTPS to encrypt data in transit. Optionally, sensitive data, such as user identifiers, are encrypted before they are stored in the database arrangement 110. Further optionally, robust validation checks are implemented to ensure that requests from the web server 106 to generate or update user identifiers are legitimate and free from malicious content. In an embodiment, the user ID service 108 is deployed on a cloud platform like AWS, Google Cloud, or Azure. Beneficially, deploying the user ID service 108 in cloud platform ensures high availability, scalability, and reliability of the server arrangement. Optionally, docker is used to containerize the user id service 108, thus making the user id service 108 portable and consistent across different environments. Further, optionally, Kubernetes manages the deployment, scaling, and operation of these containers.

The social media application is a part of the social media platform that enables users to create, share, and interact with content, as well as connect with other users. In an embodiment, the application comprises several core components, from the frontend interface to the backend infrastructure, including various services 106, 108 and databases 110. In an embodiment, the frontend, or client-side, residing in the user device 102, includes the user interface (UI) designed using HTML, CSS, and JavaScript frameworks like React, Angular, or Vue.js, and User Experience (UX) features that provide intuitive and engaging experiences such as feeds, notifications, and real-time interactions. Optionally, displaying the user interface on the user device to allow the user to modify values in the one or more attributes of the created circle object. In an embodiment, mobile applications installed in the user device 102 are developed using Swift for iOS, Kotlin or Java for Android, or cross-platform frameworks like React Native or Flutter. On the backend, or server-side, the server arrangement 104 handles HTTP requests from clients (frontend) 102 and routes them to appropriate backend services 106, 108 processed in the server arrangement 104, commonly using Node.js, Django, Flask, or Spring Boot. In an embodiment, the web server 106 executes algorithms, processes data, and interacts with the database 110. In an embodiment, the database 110 comprises one of PostgreSQL, MySQL, or MongoDB. In an embodiment, APIs (Application Programming Interfaces) facilitate communication between frontend 102 and backend services 104, with RESTful APIs allowing data exchange and operations like creating posts, retrieving user profiles, and updating settings, and GraphQL providing a more flexible and efficient data retrieval alternative. In an embodiment, several functionalities that are integral to the social media platform are operable via circle objects and circle of influence objects. In an embodiment, the social media platform, inter alia, executes one or more of user authentication, user authorization, user login and registration or onboarding, session management, content management, messaging functions, feed generation, analytics and metrics to track user activities, engagement, and growth, and caching mechanisms. In an embodiment user registration function 100 involves the user ID service 108 configured to generate unique user identifiers. In an embodiment, the user login and registration is implemented using OAuth, JWT tokens, or traditional session management, and ensures users have appropriate permissions. In an embodiment, content management allows users to create, edit, and delete posts, store media in cloud storage services like AWS S3 or Google Cloud Storage, and implements automated and manual content moderation. In an embodiment, social interactions include features like likes, comments, shares, followers, and following are implemented through circle objects and circle of influence objects. In an embodiment, direct messaging capabilities between users are often implemented using WebSockets for real-time communication. In an embodiment, feed generation uses algorithms to personalize content and push new content to users' feeds in real-time using WebSockets or server-sent events. In an embodiment, analytics and metrics track user activities, engagement, and growth through circle of influence objects, while performance monitoring tools like Prometheus, Grafana, or New Relic monitor application performance and server health. Beneficially, data encryption ensures that data is encrypted during transmission. In an embodiment, data encryption is implemented using HTTPS/TLS and at rest in databases and cloud storage. Moreover, privacy controls allow users to manage their privacy settings, control data sharing, and delete accounts while adhering to data protection regulations like GDPR and CCPA. In an embodiment, scalability and performance is managed through load balancing, wherein incoming traffic is distributed across multiple servers to ensure high availability and reliability, and caching mechanisms like Redis or Memcached are implemented to reduce load on the database 110 and speed up data retrieval. Moreover, auto-scaling is typically managed by cloud services like AWS, Azure, or Google Cloud, automatically adjusts the number of server instances based on traffic and usage patterns. An example flow of user onboarding and interaction 100 in a social media application includes the user downloading and installing the app from a marketplace (App Store or Google Play) or direct link, registering by providing necessary information (e.g., email, phone number, captcha), and logging in, with the user ID service 108 generating a unique user identifier and an authentication service validating their credentials. When creating and sharing content, the user creates a post that is sent to the backend via an API call, stored in the database and cloud storage 110, and updated in real-time in the user's followers' feeds. User engagement involves other users interacting with the post by liking or commenting, triggering updates in the database and notifying the original poster, with notifications sent to inform users of new interactions.

Figure 2:
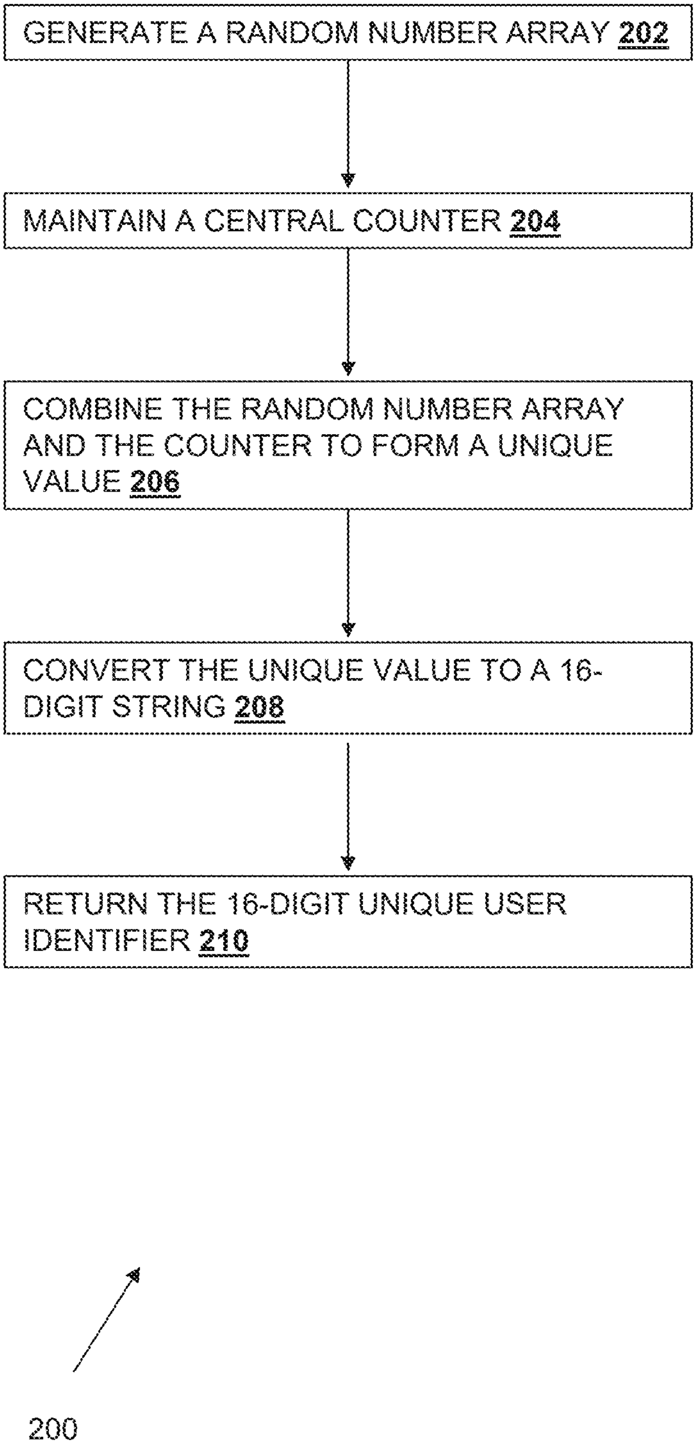
FIG. 2 is a flow chart that illustrates an exemplary method 200 for generation of at least one 16-digit random unique user identifier, in accordance with an exemplary embodiment of the disclosure.

FIG. 2 is a flow chart that illustrates an exemplary method 200 for generation of at least one 16-digit random unique user identifier, in accordance with an exemplary embodiment of the disclosure. Referring to FIG. 2, the user ID service 108 is invoked through an API call from the web server 106 to generate at least one user identifier. Optionally, the user ID service 108 is configured to generate a plurality of user identifier corresponding to plurality of user. Optionally, the user ID service 108 is configured to generate one or more user identifier corresponding to the user of the user device 102. Beneficially, each of the plurality of user identifiers are 16-digit random user identifier.

At step 202, a random number array is generated. Optionally, generating the random number array comprises generating an array of random bytes with a length defined as ID_LENGTH, wherein the length is 16 bytes. Optionally, generating the random number array comprises calling a function, RANDOM, which is an instance of a random number generator, to fill the random bytes array with random values. Optionally, the function RANDOM is configured to use the java.util.Random class for generating random numbers.

At step 204, a central counter is maintained. Optionally, maintaining the central counter comprises accessing the counter to ensure thread safety during the counter increment operation, wherein the central counter is a shared atomic long variable. Optionally, maintaining the central counter comprises ensuring the counter is maintained by the user ID service. Optionally, the atomic long variable is updated within a synchronized block to prevent race conditions.

At step 206, the random number array and the counter are combined to form a unique value. Optionally, combining the random number array and the counter to form the unique value comprises performing bitwise operations to concatenate the random bytes and the counter to form a single 56-bit value. Optionally combining the random number array and the counter to form the unique value comprises ensuring each byte is bitwise ANDed with 0xff to convert it from a signed byte to an unsigned byte. Optionally left-shifting the 56-bit combined value by 8 bits and appending the lower 8 bits of the counter to the shifted value using a bitwise OR operation. Optionally, the bitwise operations used to combine the random bytes and the counter comprises left-shifting each byte of the random bytes array by a multiple of 8 bits and combining the shifted bytes using a bitwise OR operation to form the 56-bit value.

At step 208, the unique value is converted to a 16-digit string. Optionally, converting the unique value to the 16-digit string comprises converting the 64-bit unique value into a 16-digit string with leading zeroes using a StringFormat method. Optionally, converting the unique value to the 16-digit string comprises applying a modulo operation with 10000000000000000L to ensure the unique value remains within the 16-digit range. Optionally, the StringFormat method is used to format the unique value into a 16-digit string with leading zeroes.

At step 210, the 16-digit unique user identifier is returned to the web server 106. Optionally, returning the 16-digit unique user identifier comprises calling a SecureAPI method to return the unique identifier generated and passing the unique identifier to the web server for further processing. Beneficially, the SecureAPI method ensures the secure transmission of the unique identifier to the web server 106.

Figure 3:
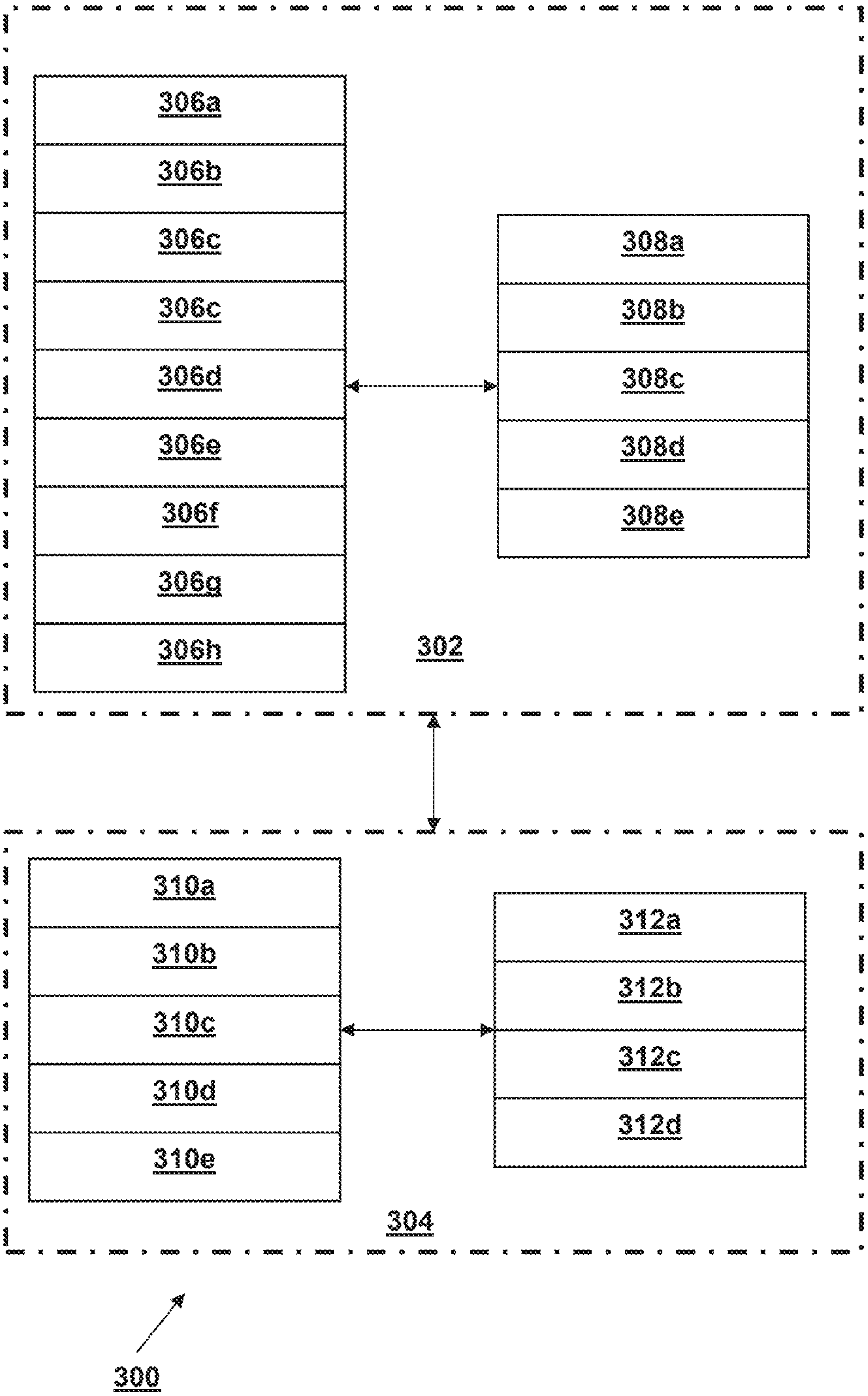
FIG. 3, is a block diagram that illustrates an exemplary structure for circle objects and circle of influence objects, in accordance to the exemplary embodiments of the disclosure.

FIG. 3, is a block diagram that illustrates an exemplary structure for circle objects and circle of influence objects, in accordance to the exemplary embodiments of the disclosure. Referring to FIG. 3, the web server 106 is configured to create a circle object 302 and a circle of influence (COI) object 304 associated with the user identifier. The circle object 302 comprises of one or more attributes **306*a*, 306*b*, 306*c*, 306*d*, 306*e*, 306*f*, 306*g*, 306*h* and functions 308*a*, 308*b*, 308*c*, 308*d*, 308*e* to represents a group of users for one or more specific purpose. In an embodiment, the one or more specific purposes comprises of friends, family, colleagues, sports, entertainment. The circle of influence object 304 comprises of one or more attributes 310*a*, 310*b*, 310*c*, 310*d*, 310*e* and functions 312*a*, 312*b*, 312*c*, 312*d* to track and update the circle object 302 based on the user activities in the social media application. The one or more attributes of the circle object 302 comprises of circle identifier 306*a*, user identifier 306*b*, circle name 306*c*, data of circle creation 306*d*, members 306*e*, permissions 306*f*, activity feed 306*g*, and visibility settings 306*h*. The one or more functions of the circle object 302 comprises of member management functions 308*a*, content management functions 308*b*, notification functions 308*c*, moderation functions 308*d*, and analytics functions 308*e*. The one or more attributes of the circle of influence 304 comprises of circle of influence identifier 310*a*, influence score 310*b*, interaction metrics 310*c*, role definitions 310*d*, and content visibility 310*e*. The one or more functions of the circle of influence 304 comprises of influence calculation functions 312*a*, role management functions 312*b*, content prioritization functions 312*c*, and insight functions 312*d***.

The one or more attributes of the circle object 302 comprises of circle identifier **306*a*, user identifier 306*b*, circle name 306*c*, data of circle creation 306*d*, members 306*e*, permissions 306*f*, activity feed 306*g*, and visibility settings 306*h*. Optionally, the circle identifier 306*a* of the circle object 302 comprises a unique identifier for the circle. Optionally, the user identifier 306*b* of the circle object 302 comprises unique identifier of the user associated with the user device 102 who created the circle. Optionally, circle name 306*c* comprises name of the circle. Optionally, data of circle creation 306*d* comprises date when the circle was created. Optionally, members 306***e* comprises list of user identifiers who are part of the circle. Optionally, permissions 306*f* defines actions members can perform (post, comment, invite). Optionally, activity feed 306*g* comprises list of posts and interactions within the circle. Optionally, visibility settings 306*h* defines whether the circle is public or private.

The one or more functions of the circle object 302 comprises of member management functions 308*a*, content management functions 308*b*, notification functions 308*c*, moderation functions 308*d*, and analytics functions 308*e*. Optionally, the member management function 308*a* adds, removes, and manage member permissions. Optionally, the content management 308*b* handle posts, comments, likes within the circle. Optionally, the notification function 308*c* manages notifications related to circle activities. Optionally, the moderation function 308*d* ensure content follows community guidelines. Optionally, the analytics function 308*e* track and provide insights into circle activities.

The one or more attributes of the circle of influence 304 comprises of circle of influence identifier 310*a*, influence score 310*b*, interaction metrics 310*c*, role definitions 310*d*, and content visibility 310*e*. Optionally, the circle of influence identifier 310*a* comprises a unique identifier for the circle of influence. Optionally, the influence score 310*b* comprises scores assigned to members based on their activity and engagement. In an embodiment, the influence score 310*b* is based on one or more predefined parameters. In an embodiment, the influence scores 310*b* are based on the interaction metrics and comprises of one or more algorithms to determine the influence score. Optionally, the interaction metric 310*c* comprises of data on posts, comments, likes, and other interactions. Optionally, the role definitions 310*d* comprises of roles and permissions influenced by member's scores. Optionally, the content visibility attribute 310*e* adjusts content prominence based on influence score 310*b*.

The one or more functions of the circle of influence 304 comprises of influence calculation functions 312*a*, role management functions 312*b*, content prioritization functions 312*c*, and insight functions 312*d*. Optionally, the influence calculation function 312*a* comprises of calculate influence function and update influence function. Further optionally, the calculate influence function determine influence scores for members based on predefined metrics (e.g., number of posts, likes, comments). Further optionally, update influence function continuously update scores based on ongoing activities and interactions. Optionally, the role management functions 312*b* comprises assigning roles and permissions within the circle based on influence. Optionally, content prioritization function 312*c* promotes or demotes content visibility based on member influence score 310*b*. Optionally, insight function 312*d* offer data and analytics on influence dynamics within the circle.

In an embodiment, the circle object 302 and circle of influence object 304 work together to manage the dynamics within a circle, enhancing user engagement and content visibility. In an embodiment, the web server 106 creates the circle. The circle object 302 is instantiated with initial attributes (e.g., circle identifier, user identifier, circle name). Optionally, the member management function 308*a* enables the user associated with the user device 102 adds members to the circle. The circle object 302 updates its member 306*e* list attribute and assigns initial roles/permissions. The circle object instructs the circle of influence object 304 begins tracking these members' (users) activities to calculate their influence scores 310*b*. The users post content, comment, and like posts within the circle. The circle object 302 manages these interactions through the moderation functions 308*d*. The circle of influence object 304 tracks these interactions, updating influence scores 310*b* based on member activity and engagement. Optionally, the server arrangement 104 prioritizes content based on influence scores 310*b*. Beneficially, the circle of influence object 304 determines the prominence of posts within the activity feed 306*g* of the circle object. Optionally, the server arrangement manages notification through influence score of members', posts with high score are given higher visibility. The circle object 302 adjusts the activity feed 306*g* to reflect the prioritized content. In an embodiment, an influential member organizes an event. The circle of influence object 304 recognizes the member's influence and promotes the event within the circle. The circle object 302 ensures the event appears prominently in the feed and sends notifications to members. In an embodiment, circle administrators review analytics to understand engagement and influence dynamics. The circle of influence object 304 provides detailed data on member influence and interaction patterns. The circle object 302 presents this data in a user-friendly format, offering insights for better circle management. The circle object 302 manages the structural and operational aspects of a circle, including member management, content handling, and notifications. The circle of influence 304 object focuses on influence dynamics, calculating and updating influence scores, and adjusting content visibility based on these scores. Together, they create a dynamic and engaging environment within each circle, enhancing user interactions and experiences in the social media application.

Figure 4:
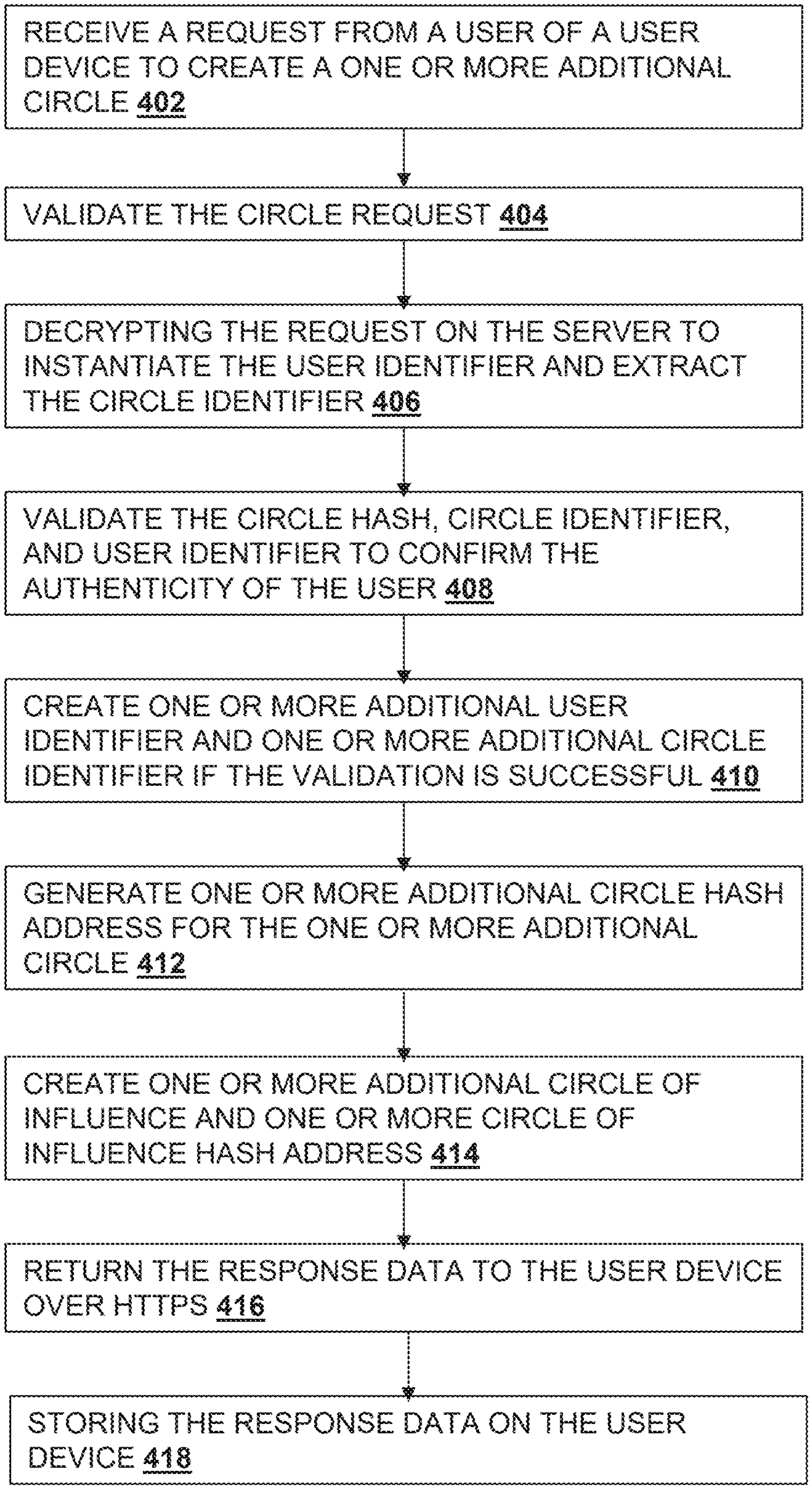
FIG. 4 is a flow chart that illustrates an exemplary method 400 for generating additional circles and their associated circle of influence in the social media platform, in accordance with an exemplary embodiment of the disclosure.

FIG. 4 is a flow chart that illustrates an exemplary method 400 for generating additional circles and their associated circle of influence in the social media platform, in accordance with an exemplary embodiment of the disclosure. Optionally, the web server is operable to generate one or more additional user identifier, and corresponding one or more additional circle objects and one or more additional circle of influence objects. Beneficially, each of the user identifier, circle object and circle of influence object operate independently.

At step 402, a request is received from a user of a user device to create one or more additional circle. Optionally, the request includes encrypted user identifier, encrypted circle identifier, and encrypted circle hash address, and a circle request, wherein the circle request comprising of machine identifier of the user device.

At step 404, the additional circle request is validated. Optionally, the circle request is validated by checking an x-machine-id from the user device to confirm the request originates from a secure connected application installed by the user.

At step 406, the request is decrypted on the server to instantiate one or more user identifiers and extract the circle identifier.

At step 408, the circle hash, circle identifier, and user identifier is validated to confirm the authenticity of the user.

At step 410, one or more public key and one or more private key are generated based on the received one or more additional user identifiers.

At step 412, one or more additional circle object, and one or more additional circle of influence object are created if the validation is successful. Optionally, the one or more additional user identifier is associated with the one or more additional circle object and one or more additional circle of influence object. Optionally, the circle object comprises of one or more attributes and functions to represents a group of users for one or more specific purpose. Optionally, circle of influence object comprises of one or more attributes and functions to track and update the circle object based on the user activities in the social media application. Optionally, creating a new circle identifier comprises checking if the circle identifier already exists in the database.

At step 414, one or more additional circle hash address for the one or more additional circle and one or more additional circle of influence hash address for the one or more additional circle of influence are generated. Optionally, the circle hash address is based on a circle identifier and the user identifier. Optionally, the circle of influence hash address is based on the circle hash address and circle of influence identifier.

At step 416, the hash address of the circle object and the circle of influence (COI) object is encrypted using the generated public key.

At step 418, the response data is returned to the user device over HTTPS. Optionally, the response data includes the new circle identifier, circle hash address, COI, and COI hash address.

Figure 5:
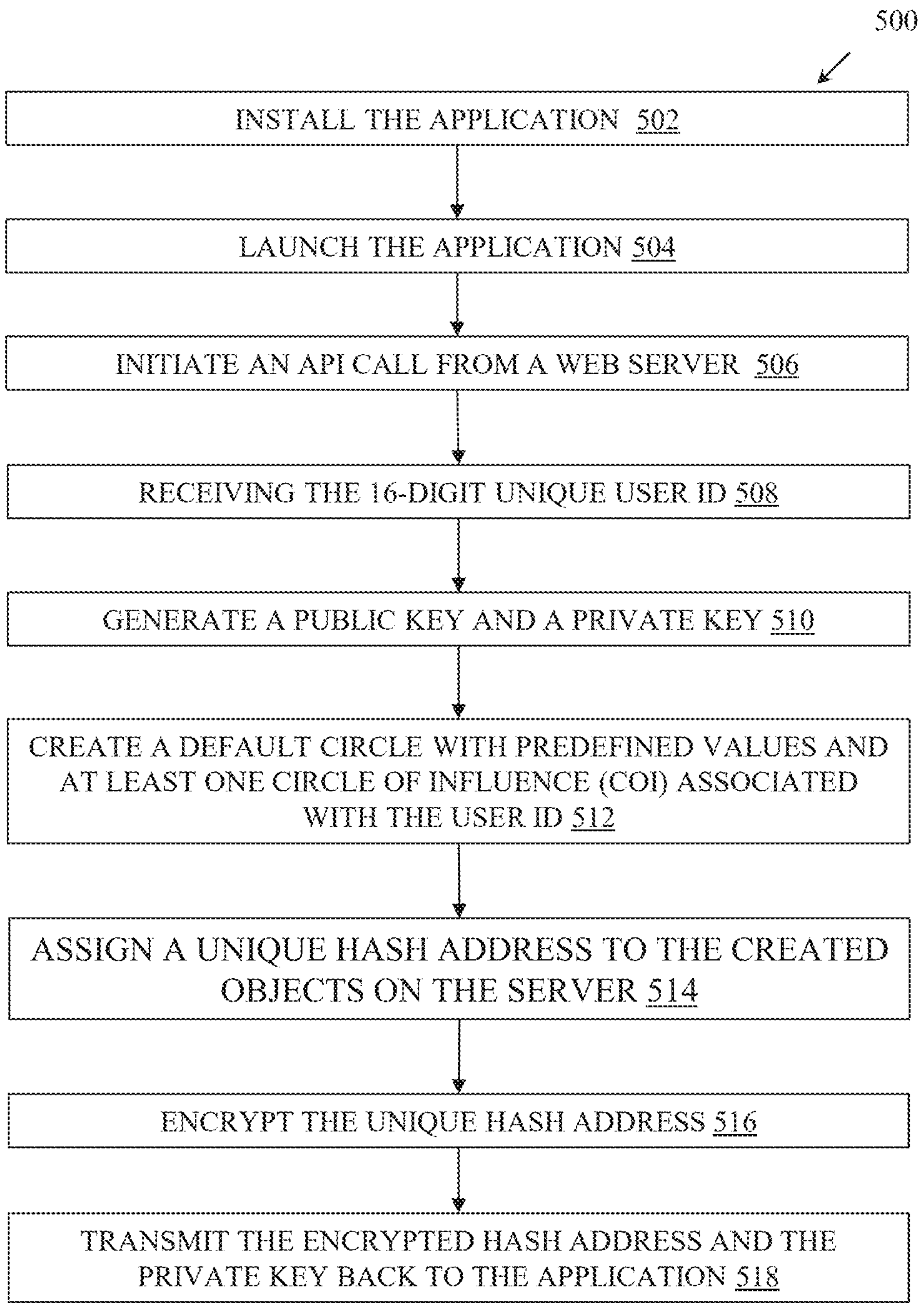
FIG. 5, is a flow chart that illustrates an exemplary method 500 for secured and private onboarding of a user in a social media platform, in accordance with an exemplary embodiment of the disclosure.

At step 420, the response data is stored on the user device. Optionally, storing the user identifier, the encrypted hash address and the private key in a secure storage area of the user device FIG. 5, is a flow chart that illustrates an exemplary method 500 for secured and private onboarding of a user in a social media platform, in accordance with an exemplary embodiment of the disclosure.

At step 502, the application is installed onto a user device 102.

At step 504, the application is launched in the user device 102. Optionally, the application displays a launch screen. Optionally, the launch screen includes an animation or progress indicator to inform the user of the ongoing onboarding process.

At step 506, an API call is initiated from a web server 106 to a user ID 108 service upon receiving instruction from the application of the user device 102. Optionally, the API call requesting the generation of at least one 16-digit random unique user identifier.

At step 508, the at least one unique user identifier is received by the web server 106 from the user ID service 108.

At step 510, a public key and a private key is generated by the web server 106 upon receipt of the received user identifier. Optionally, the public and private keys are generated using an asymmetric cryptographic algorithm.

At step 512, a circle object 302 and a circle of influence (COI) object 304 associated with the at least one user identifier is created by the web server 106. Optionally, the circle object 302 comprises of one or more attributes and functions represents a group of users created for one or more specific purposes. Further optionally COI object 304 comprises of one or more attributes and functions to track and update the circle object 302 based on the user activities in the social media application. Optionally, the web server periodically updates the one or more attributes of the circle based on user activity and interactions detected by the circle of influence objects.

At step 514, hash address of the created circle object 302 and circle of influence (COI) object 304 is created by the web server 106. Optionally, the circle hash address is based on a circle identifier and the user identifier. Further optionally, the circle of influence hash address is based on the circle hash address and circle of influence identifier. Optionally, the encryption of the hash address is performed using the Advanced Encryption Standard (AES) algorithm.

At step 516, the hash address of the circle object 302 and the Circle of Influence (COI) object 304 is encrypted using the generated public key.

At step 518, the at least one user identifier, the encrypted hash addresses, and the private key is transmitted back to the application on the user device 102 by the web server 106.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer-readable storage and/or media, having stored thereon, a machine code and/or a computer program having at least one code section executable by a machine and/or a computer, thereby causing the machine and/or computer to perform the steps as described herein.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A method for secured and private onboarding of a user in a social media platform, comprising:

installing an application onto a user device;

launching the application, wherein the application displays a launch screen;

initiating an application programming interface (API) call from a web server to a user identifier (ID) service upon receiving instruction from the application of the user device, wherein the API call requests the generation of at least one 16-digit random unique user identifier;

receiving, by the web server, the at least one 16-digit random unique user identifier from the user ID service;

generating, by the web server, a public key and a private key upon receipt of the at least one 16-digit random unique user identifier;

creating, by the web server, a circle object and a circle of influence (COI) object associated with the at least one 16-digit random unique user identifier, wherein the circle object comprises of one or more attributes and functions that represent a group of users created for one or more specific purposes, and wherein the COI object comprises of one or more attributes and functions to track and update the circle object based on the user activities in the social media platform;

creating, by the web server, a circle hash address of the circle object and a circle of influence hash address of the circle of influence (COI) object, wherein the circle hash address is based on a circle identifier and the at least one 16-digit random unique user identifier, and wherein the circle of influence hash address is based on the circle hash address and a circle of influence identifier;

encrypting, by the web server, the circle hash address of the circle object and the circle of influence hash address of the Circle of Influence (COI) object using the generated public key;

transmitting, by the web server, the at least one 16-digit random unique user identifier, the encrypted circle hash address, the encrypted circle of influence hash address, and the private key back to the application on the user device wherein the at least one 16-digit random unique user identifier, the encrypted circle hash address, the encrypted circle of influence hash address, and the private key constitute user identity data stored securely on the user device and embedded within the application, the user identity data being synchronized with a server arrangement to verify the user before allowing access to the server arrangement.

2. The method as claimed in claim 1, wherein the user ID service comprises of one or more algorithms to generate the at least one 16-digit random unique user identifier.

3. The method as claimed in claim 1, wherein the one or more attributes of the circle object comprises of circle identifier, user identifier, circle name, data of circle creation, members, permissions, activity feed, and visibility settings, wherein the one or more functions of the circle object comprises of member management functions, content management functions, notification functions, moderation functions and analytics functions.

4. The method as claimed in claim 1, wherein the one or more attributes of the circle of influence comprises of circle of influence identifier, influence score, interaction metrics, role definitions and content visibility, wherein the one or more functions of the circle of influence comprises of influence calculation functions, role management functions, content prioritization functions and insight functions.

5. The method as claimed in claim 1, further comprising displaying a user interface on the user device to allow the user to modify values in the one or more attributes of the created circle object.

6. The method as claimed in claim 1, wherein the public and private keys are generated using an asymmetric cryptographic algorithm.

7. The method as claimed in claim 1, further comprising storing the at least one 16-digit random unique user identifier, the encrypted circle hash address, the encrypted circle of influence hash address and the private key in a secure storage area of the user device.

8. The method as claimed in claim 1, wherein the encryption of the circle hash address and the circle of influence hash address is performed using the Advanced Encryption Standard (AES) algorithm.

9. The method as claimed in claim 1, wherein the web server periodically updates the one or more attributes of the circle based on user activity and interactions detected by the circle of influence objects.

10. The method as claimed in claim 1, wherein the launch screen includes an animation or progress indicator to inform the user of the ongoing onboarding process.

11. The method as claimed in claim 1, further comprises verifying the user based on OTP or task-based captcha for human verification.

12. A system for secure and private onboarding a user, comprising:

a user device comprising a secure storage area and a processor, configured to:
  install an application; and
  launch the application, wherein the application displays a launch screen;

a server arrangement communicatively coupled with the user device, the server arrangement comprises,
  a web server configured to initiate an application programming interface (API) call to a user identifier (ID) service upon receiving instruction from the application of the user device, the API call requesting the generation of at least one 16-digit unique user identifier;
  the user ID service configured to generate and transmit the at least one 16-digit unique user identifier to the web server;
  the web server further configured to:
    receive the at least one 16-digit unique user identifier from the user ID service;
    generate a public key and a private key based on the at least one 16-digit unique user identifier;
    create a circle object and a circle of influence (COI) object associated with the at least one 16-digit unique user identifier, wherein the circle object comprises one or more attributes and functions to represent a group of users for one or more specific purposes, and wherein the COI object comprises one or more attributes and functions to track and update the circle object based on the user activities in the social media platform;
    create, a circle hash address of the circle object and a circle of influence hash address of the circle of influence (COI) object, wherein the circle hash address is based on a circle identifier and the at least one 16-digit random unique user identifier, and wherein the circle of influence hash address is based on the circle hash address and a circle of influence identifier;
    encrypt, the circle hash address of the circle object and the circle of influence hash address of the Circle of Influence (COI) object using the generated public key;
    transmit, the at least one 16-digit random unique user identifier, the encrypted circle hash address, the encrypted circle of influence hash address, and the private key back to the application on the user device wherein the at least one 16-digit random unique user identifier, the encrypted circle hash address, the encrypted circle of influence hash address, and the private key constitute user identity data stored securely on the user device and embedded within the application, the user identity data being synchronized with the server arrangement to verify the user before allowing access to the server arrangement.

13. The system as claimed in claim 12, wherein the user ID service comprises of one or more algorithms to generate the at least one 16-digit random unique user identifier.

14. The system as claimed in claim 12, wherein the one or more attributes of the circle object comprises of circle identifier, user identifier, circle name, data of circle creation, members, permissions, activity feed, and visibility settings, wherein the one or more functions of the circle object comprises of member management functions, content management functions, notification functions, moderation functions, and analytics functions.

15. The system as claimed in claim 12, wherein the one or more attributes of the circle of influence comprises of circle of influence identifier, influence score, interaction metrics, role definitions, and content visibility, wherein the one or more functions of the circle of influence comprises of influence calculation functions, role management functions, content prioritization functions, and insight functions.

16. The system as claimed in claim 12, wherein the application displays a user interface on the user device to allow the user to modify values in the one or more attributes of the created circle object.

17. The system as claimed in claim 12, wherein the public and private keys are generated using an asymmetric cryptographic algorithm.

18. The system as claimed in claim 12, wherein the application stores the at least one 16-digit unique user identifier, the encrypted circle hash address, the encrypted circle of influence hash address and the private key in a secure storage area of the user device.

19. The system as claimed in claim 12, wherein the encryption of the circle hash address and the circle of influence hash address is performed using the Advanced Encryption Standard (AES) algorithm.

20. The system as claimed in claim 12, wherein the web server periodically updates the one or more attributes of the circle based on user activity and interactions detected by the circle of influence objects.

21. The system as claimed in claim 12, wherein the launch screen includes an animation or progress indicator to inform the user of the ongoing onboarding process.

* * * * *